H. O. EVANS.
UNION HEAD MACHINE.
APPLICATION FILED NOV. 5, 1910.
1,070,590.
Patented Aug. 19, 1913.
4 SHEETS—SHEET 2.
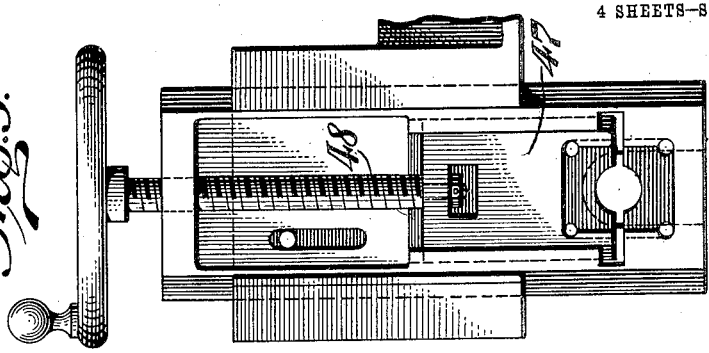
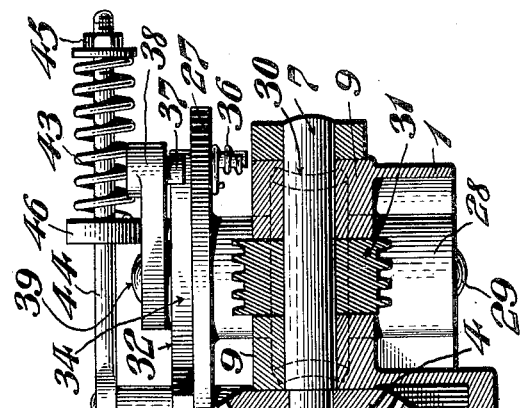
WITNESSES
INVENTOR H. O. EVANS.
UNION HEAD MACHINE.
APPLICATION FILED NOV. 5, 1910.
1,070,590.
Patented Aug. 19, 1913.
4 SHEETS—SHEET 3.
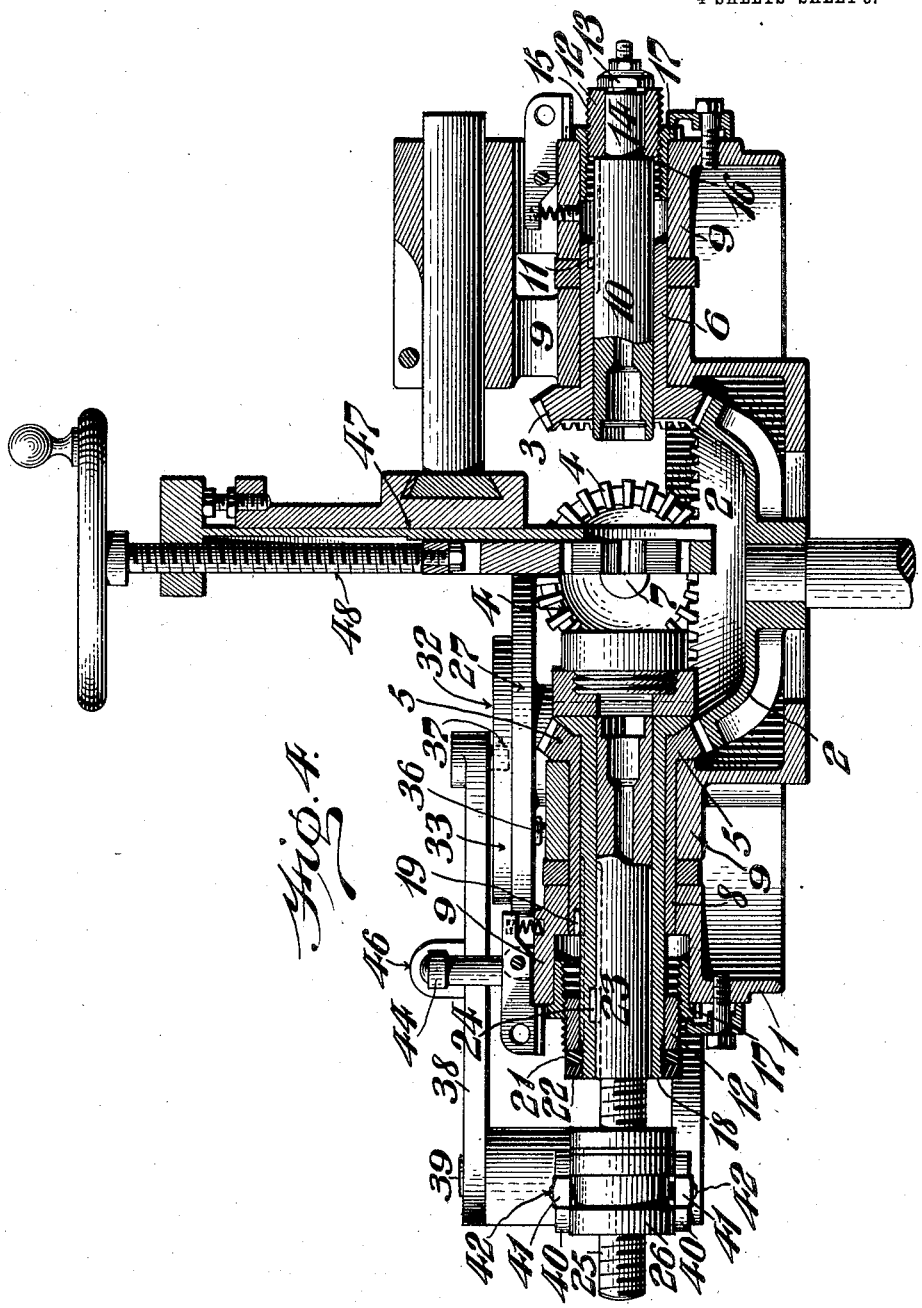
WITNESSES
H. F. Dieterich
L. Douville.
INVENTOR
Henry O. Evans.
BY
Wiedersheim & Fairbanks.
ATTORNEYS

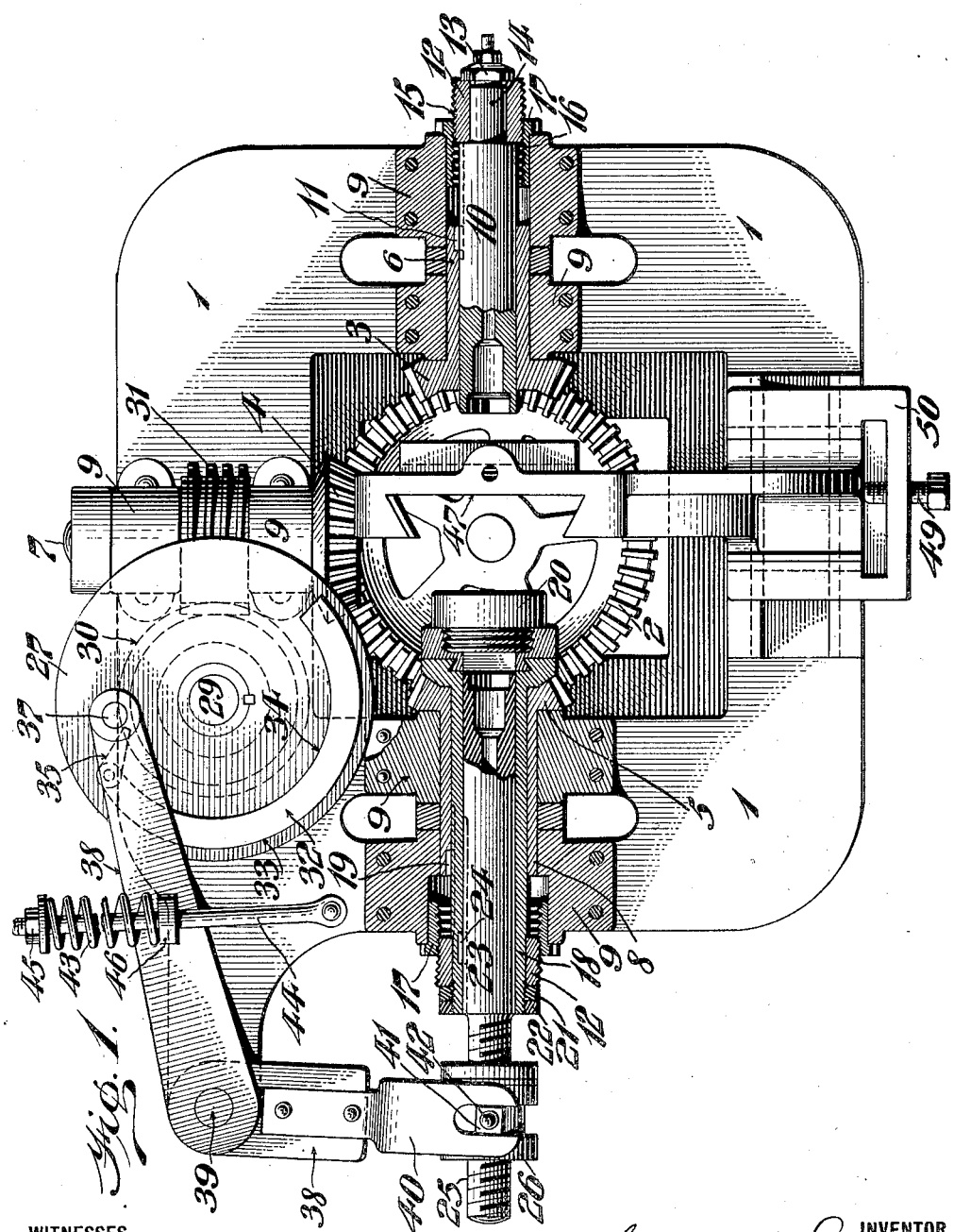

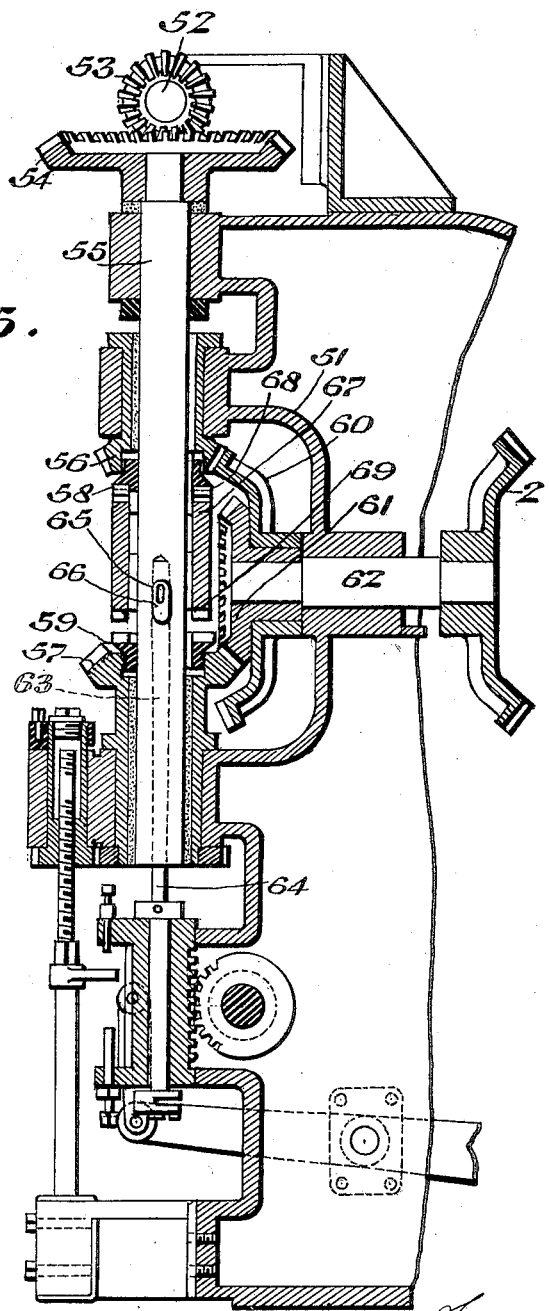

UNITED STATES PATENT OFFICE.

HENRY O. EVANS, OF PHILADELPHIA, PENNSYLVANIA.

UNION-HEAD MACHINE.

1,070,590.   Specification of Letters Patent.   Patented Aug. 19, 1913.

Application filed November 5, 1910. Serial No. 590,886.

*To all whom it may concern:*

Be it known that I, HENRY O. EVANS, a citizen of the United States, residing in the city and county of Philadelphia, State of Pennsylvania, have invented a new and useful Union-Head Machine, of which the following is a specification.

This invention relates to a machine for forming union heads and has for an object to provide a machine wherein the reaming and facing operation takes place simultaneously with the threading operation, whereby the two operations are combined to effect, in a single step, a complete union head.

In union head machines as heretofore constructed, the operation of reaming and facing is a separate and distinct one, performed usually on a separate machine from that cutting the threads or else the same has been done on the same machine by operating the reaming spindle by hand as a separate step or by the use of a turret, either of which means consumes twice the time of a single operation.

In my present invention I have combined with the positive feed reversing mechanism, a second operating mechanism connected to operate the reaming and facing tool and operated by the same reversing mechanism, whereby both operations take place simultaneously and only one machine is employed.

It further consists of other novel features of construction, all as will be hereinafter fully set forth.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan of a machine embodying my invention, certain parts being shown in section, for clearness. Fig. 2 represents a section on line $x$—$x$, Fig. 1. Fig. 3 represents a detail of the chuck mechanism. Fig. 4 represents a section on line $y$—$y$, Fig. 1. Fig. 5 represents a vertical section of a reversing mechanism used in connection with my novel machine.

Similar numerals of reference indicate corresponding parts in the figures.

Referring to the drawings: 1 designates the bed of a union head machine, the same having suitably mounted therein a gear 2, driven from any suitable source of power and forming the main driving means of the machine. This gear 2 meshes with a plurality of bevel gears 3, 4 and 5, each of which has preferably formed integral therewith a sleeve, respectively designated by the numerals 6, 7 and 8, it of course being understood that suitable bearing supports 9 are mounted on the bed plate to support the same in operative position.

10 designates a spindle slidingly mounted within the sleeve 6 and secured for rotation therewith by means of a key 11, said spindle forming a holder for a suitable tap adapted to internally thread the union head. In order to advance the spindle 10 to bring the tool into contact with the work, a leader nut 12 is fixedly secured by means of a nut 13 or the like to a reduced portion 14 of the spindle, the said leader nut 12 having an external thread 15 meshing with the thread 16 of a bushing 17 fixedly secured to the bearing 9. It will thus be apparent that a rotation of the sleeve 6 will cause the spindle 10 to rotate also and thus transmit movement to the leader nut, which feeds in the bushing 17, according to the direction in which the spindle 10 is rotated.

18 designates a hollow spindle secured by a key 19 to the sleeve 8 and forming a holder for a suitable die 20, which latter coöperates with the union head to form the external thread thereon. It will be noted in the present instance that the die 20 is detachably secured to the spindle 18 through the medium of a bushing member $20^x$, preferably held in position by a dovetailed connection, as will be apparent. This spindle 18 is reciprocated in a manner similar to the operation of the spindle 10 by means of a similar leader nut 12 and bushing 17, it being noted that in this instance a collar 21 is screw-threaded upon the spindle 18 and abuts the leader nut 12 to transmit the movement of the latter to the said spindle 18. A lock nut 22 is employed to maintain the parts in operative position.

23 designates a spindle forming a holder for a suitable reaming and facing tool, the said spindle being secured by a key 24 to the hollow spindle 18, whereby it may rotate therewith, the said key 24 working in a slot 24˟ to permit reciprocation of the spindle 23 relative to the hollow spindle 18. This spindle 23 has a threaded portion 25, having mounted thereon a collar 26 forming a connection with the reciprocating means for the said spindle 23. In the present instance this reciprocating means consists of a disk 27 keyed to a suitable shaft 29, which is suitably mounted for rotation in the frame of the machine, the said shaft 29 having a gear 30 thereon meshing with a worm 31 fixedly secured upon the sleeve 7 forming a part of the bevel gear 4.

32 designates a cam fixedly secured to the face of the disk 27, the said cam having an external face 33 and an internal face 34 and terminating at a point determined by the length of feed desired for the spindle 23. Pivotally mounted at one end of the cam is a pawl 35 normally held in operative position by means of a spring 36 and serving to guide the cam roller 37 to the external face 33 after a reversing operation. This cam roller 37 is rotatably mounted upon a bell crank lever 38 pivoted at 39 to a suitable portion of the bed 1, the opposite end of the said bell crank having secured thereto a forked arm 40 coöperating with a nut 41 mounted upon a pin 42 secured to the collar 26. It will thus be apparent that as the disk 27 rotates, the cam face 33 will move the roller 37 so as to cause a swinging of the bell crank arm 38 and thus move the spindle 23 in one direction, while during the reverse, movement in the other direction is caused, in the present instance, by means of a spring 43 suitably mounted upon a rod 44 fixed to the bed 1 and held in place by means of an adjusting nut 45. One end of the spring 43, as will be apparent, abuts a lug 46, preferably formed integral with the bell crank 38, so as to affect the movement desired.

47 designates a plate slidably mounted on the bed 1, movement of which is controlled by threaded spindle 48, the said plate forming a chuck to receive the head to be operated upon. A suitable stop 49 is mounted in the guide frame 50 of the plate 47 and serves to limit the movement of the same and insuring the proper alinement of the union head with the cutting tools.

51 designates the frame of the union head machine adapted to receive power from the main driving shaft 52, which carries a beveled gear 53 meshing with a similar gear 54, keyed to the operating shaft 55 of the reversing mechanism.

56 and 57 designate respectively, beveled gears suitably mounted for rotation on the operating shaft 55 and having clutch faces 58 and 59 carried thereby. The gear 56, in the present instance, meshes with a gear 60 and the gear 57 with a gear 61, both gears being mounted on the driving shaft 62 which carries the driving gear 2 of the union head chuck. It will be noted that the gear 60 is of larger diameter than the gear 61, and serves as a driving member during the working stroke, while the gear 61 is used to give a quick return movement during the reversing operation, it of course being apparent that the arrangement of the gears 56 and 57 is such as to cause the shaft 62 to rotate in opposite directions. The shaft 55 is provided for a portion of its length with a bore 63 through which a rod 64 passes, carrying a pin 65. The latter is here shown passing through a slot 66 in the shaft 55 and joined to the clutch sleeve 67, it of course being understood that this sleeve is provided with suitable clutch faces 68 and 69 for coöperation with the respective clutch faces 8 and 9. It will thus be apparent that by shifting the rod 64 in one direction or the other, either automatically or manually, the clutch sleeve 17 will be moved to engage one or the other of the clutch faces 58 and 59 and thus rotate the shaft 62 in one direction or the other.

For the purpose of this application it is not thought necessary to go into a detailed description of the rod shifting mechanism, since the same is fully shown and described in applicant's Patent No. 1,004,862 of October 3rd, 1911.

In the operation of the machine, a union head casting is properly positioned and adjusted in the chuck member 47 and the machine started in operation, it of course being understood that a suitable die, tap and reamer are fixed on their respective holders. The movement of the machine produces a simultaneous forward feeding of the spindle 10 and the spindle 18, so that both an external and an internal thread are cut upon the casting, while at the same time rotation of the disk 27 causes the cam 32 to engage its roller 37. This movement of the cam causes the roller to ride up over the pawl 35 to the external face 33 of the cam and thus rock the lever 38 to bring the spindle 23 with its reaming and facing tool, into engagement with the casting. The machine is set to reverse at the proper time, that is when the threading operation is completed and the action is automatic, and the reverse movement is transmitted also to the disk 27. It will here be noted that the cam 32 is so designed as to advance the reamer an accurate distance into the union head and then a portion of the cam is reached, which brings the lever 38 to rest, thereby allowing the reaming tool to perform a facing operation before the parts are returned to normal position. As soon as the reverse position is reached, the roller 37 drops past the end of the cam 32 into engagement with the inside face 34 thereof, whereupon the spring 43 snaps the lever 38 back to its initial position, thus quickly withdrawing the reaming tool, while the further rotation of the disk 27 in the reverse direction forces the roller 37, past the spring pressed pawl 35, into position for another operative movement.

It will now be apparent that I have devised a new and novel combination mechanism for performing a variety of steps in the operation of forming a union head in one step, whereby a union head is quickly and accurately machined. It will furthermore be apparent that the mechanism is a complete, unitary one adapted for application and operation with any quick return reverse movement and operating effectually and efficiently for the purpose intended.

Having thus described my invention, what I claim as new and desire to secure by Letters Patent, is:

1. In a machine for forming union heads, a chuck adapted to support a union head blank, a spindle rotatably mounted on each side of said chuck and adapted for movement in either direction, one of said spindles carrying a threading die and the other a tap, a reciprocable spindle carried by said die spindle and carrying a reaming and facing tool, means for reciprocating said facing tool spindle, and means to rotate said spindles in either direction.

2. In a machine for forming union heads, a chuck adapted to support a union head blank, a spindle rotatably mounted on each side of said chuck and adapted for movement in either direction, one of said spindles carrying a threading die and the other a tap, a reciprocable spindle carried by said die spindle and carrying a reaming and facing tool, means for reciprocating said facing tool spindle, and a quick return mechanism connected to said facing tool spindle.

HENRY O. EVANS.

Witnesses:
ROBERT M. BARR,
C. D. McVAY.

---

Copies of this patent may be obtained for five cents each, by addressing the "Commissioner of Patents, Washington, D. C."